United States Patent
Bernauer et al.

(10) Patent No.: US 9,387,479 B2
(45) Date of Patent: Jul. 12, 2016

(54) METHOD OF CONTROLLING A PROCESS IN WHICH THE PARTICLE SIZE OF A MATERIAL IS REDUCED, A MACHINE FOR REDUCING THE PARTICLE SIZE OF A MATERIAL AND A METHOD OF CALIBRATING SUCH A MACHINE

(75) Inventors: Hans-Peter Bernauer, Kirchheim (DE); Wolfgang Stankmann, Village Neuf (FR); Jurgen Sill, Schopfheim (DE); Olaf Balzer, Lorrach (DE); Oliver Mecklenburg, Grenzach/Wyhlen (DE); Jorg Merten, Schopfheim (DE); Bruno Derijck, Lorrach (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 285 days.

(21) Appl. No.: 12/406,616

(22) Filed: Mar. 18, 2009

(65) Prior Publication Data
US 2009/0238928 A1    Sep. 24, 2009

(30) Foreign Application Priority Data
Mar. 18, 2008    (EP) .................................. 08005019

(51) Int. Cl.
*G01N 33/02*    (2006.01)
*B02C 4/36*    (2006.01)
(Continued)

(52) U.S. Cl.
CPC ................ *B02C 4/36* (2013.01); *A23G 1/0033* (2013.01); *A23G 1/0043* (2013.01); *A23G 1/12* (2013.01); *A23G 1/16* (2013.01)

(58) Field of Classification Search
CPC ..... A23G 1/0033; A23G 1/0043; A23G 1/12; A23G 1/16; B02C 4/36
USPC ................ 426/231, 519, 306–307, 660, 613; 241/30, 29, 33, 35, 37, 159, 227, 46.15
See application file for complete search history.

(56) References Cited

U.S. PATENT DOCUMENTS

| 3,372,878 A | 3/1968 | Verdier |
| 3,445,070 A | 5/1969 | Verdier |

(Continued)

FOREIGN PATENT DOCUMENTS

| DE | 3707745 A1 | 9/1988 |
| DE | 4226158 A1 | 2/1994 |

(Continued)

OTHER PUBLICATIONS

European Search Report, European Patent Application No. 08 005 019.8, date of completion of search Sep. 10, 2008, 6 pages (corresponds to U.S. Appl. No. 12/406,616).

(Continued)

*Primary Examiner* — Steven Leff
(74) *Attorney, Agent, or Firm* — Fitch, Even, Tabin & Flannery LLP

(57) ABSTRACT

In a method of controlling a process in which the particle size of a material is reduced by passing the material through a nip between rollers at least one operational figure, such as the motor current, of at least one motor associated with at least one roller is continuously measured and the nip is adjusted by controlling the operational figure so as to match a target operational figure. A machine for reducing the particle size of a material by passing the material through a nip between rollers has a device for measuring at least one operational figure, such as the motor current, of at least one motor associated with at least one roller and a device for adjusting the nip on the basis of the measured operational figure matching a target operational figure. A method of calibrating a machine for reducing the particle size of a material by passing the material through a nip between the rollers has the step of measuring at least one operational figure, such as the motor current, associated with a desired particle size and/or mass consistency and the step of setting the operational figure associated with a desired particle size and/or mass consistency as a target operational figure.

22 Claims, 4 Drawing Sheets

(51) Int. Cl.
 *A23G 1/00* (2006.01)
 *A23G 1/12* (2006.01)
 *A23G 1/16* (2006.01)

(56) References Cited

U.S. PATENT DOCUMENTS

| | | | |
|---|---|---|---|
| 4,519,304 A | | 5/1985 | Ripani |
| 4,603,815 A | * | 8/1986 | Ripani et al. ............... 241/36 |
| 4,746,070 A | | 5/1988 | Kuster |
| 5,154,364 A | | 10/1992 | Ketting |
| 5,156,868 A | * | 10/1992 | Muntener et al. ............ 426/231 |
| 5,709,903 A | * | 1/1998 | St. John et al. ............. 426/660 |
| 6,182,914 B1 | | 2/2001 | Carle |
| 6,213,749 B1 | * | 4/2001 | Carle ............................ 425/141 |

FOREIGN PATENT DOCUMENTS

| | | |
|---|---|---|
| DE | 19618077 C1 | 7/1997 |
| EP | 0 953 291 A1 | 11/1999 |

OTHER PUBLICATIONS

Al-Mogahwi et al., "Performance Evaluation of Mills and Separators in a Commercial Flour Mill." Food and Bioproducts Processing, 2005; 83(C1): pp. 25-35, 1 page Abstract available only.

Anon, "New Developments in Chocolate and Chocolate Products Technology." Alimentaria, 1979, 105: pp. 81-82 and 84-86, 1 page Abstract available only.

Anon, "The Buhler Two-Stage Refining System." Confectionery Manufacture and Marketing, 1983, 20(9): pp. 24-25, 1 page Abstract available only.

Anon, "Designed to Control." Food Review. 1996, 23 (11): pp. 33-34, 37, 39, 41, 43, 1 page Abstract available only.

Levine, "Estimating Sheeting Roll Closing Forces Through Measurement of Roll Power Consumption." Journal of Food Process Engineering, 1996, 19(1): pp. 113-119. 1 page Abstract available only.

Levine et al., "A Model for Predicting Forces and Work Inputs in Cereal Flaking." Cereal Foods World, 2004, 49(1): pp. 11-19, 1 page Abstract available only.

* cited by examiner

METHOD OF CONTROLLING A PROCESS IN WHICH THE PARTICLE SIZE OF A MATERIAL IS REDUCED, A MACHINE FOR REDUCING THE PARTICLE SIZE OF A MATERIAL AND A METHOD OF CALIBRATING SUCH A MACHINE

TECHNICAL FIELD

The invention relates to a method of controlling a process in which the particle size of a material is reduced, a machine for reducing the particle size of a material and a method of calibrating such a machine.

BACKGROUND ART

There are numerous processes in which the particle size of materials, such as paste or dough-like masses, semi-liquids etc., is reduced by passing the material through a gap or nip between rollers. As an example, in a chocolate making process, the ingredients of the chocolate mass are mixed and the particle size of the mixture is thereafter reduced in a so-called pre-refiner. The particle size is then further reduced in one or more refiners and subsequently the mass is supplied to one or more devices for conching or homogenize same. The described pre-refiner, which serves to reduce the particle size and adjust consistency of the chocolate mass, may comprise rollers defining a gap or nip between them, through which the chocolate mass is passed to reduce the particle size.

In this context, EP 0 123 015 A2 describes a device for monitoring and controlling the thickness of a chocolate mass, in which colorimetric signals are measured and used to control the pressure applied between the rollers.

EP 0 953 291 B1 describes a method for refining a confectionery material, such as a chocolate mass, in which the distance between rollers is continuously measured, compared with a reference distance and used to adjust the revolution speed of one of the rollers.

Finally, U.S. Pat. No. 6,182,914 B1 teaches how to measure the force exerted by a confectionery material on rollers and how to adjust the nip between the rollers so as to match a target force.

SUMMARY OF THE INVENTION

The present invention provides an improved method for controlling a process in which the particle size of a material is reduced and which serves to produce a mass having a reduced fluctuation in the particle size. This serves to render the overall process, of e.g. making a confectionery mass such as chocolate, more efficient. Moreover, the invention provides a machine leading to the same effect as well as a method of calibrating such a machine.

This object is, first of all, solved by the method described in claim 1.

Accordingly, in the method of controlling, described herein, at least one operational figure of at least one motor associated with at least one roller is measured and the nip is adjusted by controlling the operational figures so as to match a target operational figure. For example, the motor current, taken up by at least one motor associated with at least one roller, such as a motor driving a roller, may be continuously measured, and the nip is adjusted by controlling the motor current so as to match a target motor current. Additionally, or alternatively, other operational figures of at least one motor, such as the power taken up, the torque provided and the number of revolutions per minute or per second may be used in the method described herein. Whereas the following detailed description will focus on the motor current taken up by at least one motor, the invention is not limited thereto and one or more of the above operational figures or data may be used in the inventive method instead of or in addition to the motor current.

As indicated above, in the process which is controlled by the method described herein, the particle size of a material is reduced by passing the material through a gap or nip between rollers. The material may be any paste or dough-like mass, a semi-liquid, a powder, a suspension or a similar material. Currently, the method described herein is preferably used for pre-refining a chocolate mass in a chocolate making process. As regards details of the process, reference is made to the above-mentioned documents, the contents of which are incorporated herein by reference. Briefly, the ingredients of the chocolate mass are mixed in at least one mixer and then supplied to a pre-refiner. When the material leaves the mixer, the range of particle size can be about 700 to 800 micrometers. Its consistency can be described to be coarse or, as far as a semi-liquid is concerned, it can be described to be low viscous. After the pre-refiner, to which the method described herein can be applied, the particle size is around 250 micrometers or below. This may for example be achieved by a nip between rollers having a width of 100 to 200 micrometers. This approximately corresponds to a range, within which the width of the nip is adjusted as described below. When the material leaves the pre-refiner, it can be described to be a semi-liquid, paste or dough-like. Afterwards, the mass is usually supplied to one or more refiners in which the particle size is further reduced, for example to around 30 micrometers or below. The material can be described as a powder having a fluffy structure. In this context, the method described herein may also be applied to the refiner as well as any other process where the particle size of masses or semi-liquids is reduced by rollers. Application in the pharmaceutical industry or paint industry can be used as examples.

In the chocolate making process, there is a certain target particle size for each recipe. It is, moreover, desirable to achieve a low variability in the particle size and consistency of the mass leaving the pre-refiner. This is because a high variability causes variability in the quality of the final product and makes it difficult to run the downstream refiners with a high yield. As it is well known to persons skilled in the art, the particles take up fat depending on their size and physical/chemical properties. Thus, the particle size has an influence on the consistency of the mass. In particular, with a small particle size, the total surface area is increased so that more fat can be taken up, the mass becomes "more solid", and viscosity is increased. Consequently, variations in the particle size affect the consistency of the mass. Thus, a low variability is desirable and this is, according to the method described herein, achieved as follows. However, even with a given particle size, the consistency of the mass may vary because of the changes in physical/chemical properties of the raw materials.

In connection with the present invention, it has been established that the motor current taken up by the one or more motors associated with the rollers, varies depending on the consistency of the mass passing through the nip between the rollers. In other words, in the teaching described herein, emphasis is put on the consistency of the mass, which has the most significant influence on the further process, rather than the particle size, which is not directly related to the consistency. Therefore, in the previously known processes, where the nip between rollers and/or the pressure applied by the rollers was adjusted, only the particle size was considered. In contrast, the present invention has a focus on the consistency, which, as the inventors found, is interrelated with the motor current taken up by one or more motors associated with the rollers. This may be explained as follows, but the invention is not limited thereto. Shear forces arise when the material passes through the nip between rollers, speed differences between the rollers may occur, and this may affect the motor current taken up. Thus, the invention provides a particularly direct and reliable way of adjusting the operation of rollers, by taking the most important property of the mass, i.e. consistency, into consideration and making use of the interrelation with the motor current, which the inventors have found.

The consistency of the mass may, as mentioned, vary due to differences in the raw materials used and their fluctuation as they are from natural source. Based on the finding that the motor current varies depending on the consistency, the motor current may be changed over a certain range, and the throughput/yield may be measured. In a preferred procedure, the throughput/yield of the refiner, and not the pre-refiner, where the method described herein may be applied, was measured. This is based on the fact that the throughput/yield of the refiner is critical for efficiency of the entire process, and based on the inventors' finding that consistency of the mass leaving the pre-refiner has a significant influence on the throughput/yield of the refiner. Based on a maximum throughput/yield, a target motor current can be established. The above process can be considered a calibration which may be performed once for each recipe to establish the target motor current.

During the operation of the rollers, the motor current is controlled to match the target motor current. This is achieved by adjusting the nip between the rollers accordingly. It has, for example, been found that the motor current recorded decreases when the material passing through the nip is "softer", i.e. the mass passes through the nip relatively easily. In such a situation, when the pressure at the gap between the rollers is kept constant, the motors associated with the rollers take up a lower current. Alternatively, when the mass gets comparably "dry" and the pressure at the gap is kept constant between the rollers the motor takes up an increased current. This, however, if it happens during manufacturing, may lead to the problem of variability in particle size, thus throughput/yield. Additionally increased wear and abrasion of the rollers has to be expected.

As regards the "taking-up" of the motor current, this may be performed as follows. The motors which may be used in the process described herein, are built to seek a certain current. If this current becomes too high, a control stops the motor. Thus, the motors used may have an integrated ampere meter of any type and may be combined with an "off-the-shelf" control unit which continuously monitors the current taken up by the motor. In connection with the process described herein, the control unit may be used to compare the actual motor current with the target motor current and, as mentioned above, effect an adjustment of the width of the nip so as to match the actual motor current with the target motor current. This allows a highly automated and accurate control of the process for reducing the particle size of a material, whereas it has up to now been the task of operators to manually adjust the operation of the rollers or the width of the nip so as to achieve the desired consistency of the mass leaving the pre-refiner. However, different operators have different ideas about the ideal mass consistency. Moreover, the mentioned process cannot always be monitored continuously by an operator, so that adjustment steps sometimes are taken too late. In summary, there is a high variability in the consistency and particle size of the mass leaving the pre-refiner. Moreover, it cannot be guaranteed that the pre-refiner is operated with the maximum achievable yield or throughput.

By using the method described herein, these disadvantages can be overcome. As mentioned, the invention is based on the idea to control the motor current and not necessarily the pressure and/or gap applied by the rollers. This allows a more direct control based on the desired consistency and a maximum throughput/yield, as detailed above. Based on a calibration of the machine involved, a logic function is developed, which is used as follows. Whenever the measured motor current differs from the target motor current, the nip, and the pressure between the rollers is adjusted so that the actual motor current matches the target motor current. Thus, an automated adjustment is established which is significantly quicker than manual adjustment. Therefore, variation in the consistency of the mass leaving the pre-refiner is significantly reduced. Moreover, a high yield can be achieved. As a consequence, the variability in the downstream products, such as the refined chocolate mass, as well as the quality of the mass undergoing conching and the final product, can be improved. Further, the process described herein saves costs as the necessity of operators is reduced. Finally, excessive wear of the rollers can be avoided.

Preferred embodiments of the inventive method are described in the dependent claims.

As indicated above, the control method described herein was found to be particularly beneficial in a process in which the particle size of a powder and/or a semi-liquid, such as a paste or dough-like material, is reduced.

It is, moreover, currently preferred to apply the control method described herein to a method for making a confectionery mass, such as a method in which a chocolate mass is pre-refined as a part of a chocolate making process.

The above-stated object is further solved by the machine described in claim 4.

Accordingly, and to carry out the above-described control method, the machine has at least one device for measuring the motor current taken up by at least one motor associated with at least one roller, and a device for adjusting the gap or nip between rollers on the basis of the measured motor current, which is to match a target motor current.

Corresponding to the preferred embodiments of the control method, the machine described herein is preferably a pre-refiner in a machine for making a confectionery mass, such as a chocolate making machine.

Moreover, a chocolate making machine, comprising at least one mixer, at least one machine as described above, at least one, possibly a plurality of refiners and at least one and possibly a plurality of devices for conching/homogenizing a chocolate mass, is also subject matter of the present invention.

Finally, the above-stated object is solved by a method of calibrating a machine as described above. This calibrating method involves the step of measuring the motor current associated with a desired particle size and/or mass consistency and setting the motor current associated with an ideal particle size and/or mass consistency as a target motor current. Such a calibration method provides an advantageous basis for implementing the above-described control method.

BRIEF DESCRIPTION OF THE DRAWINGS

Hereinafter a non-limiting example and experimental results are explained with reference to the drawings, in which.

DETAILED DESCRIPTION OF PREFERRED EMBODIMENTS AND EXAMPLES

Figure 1:
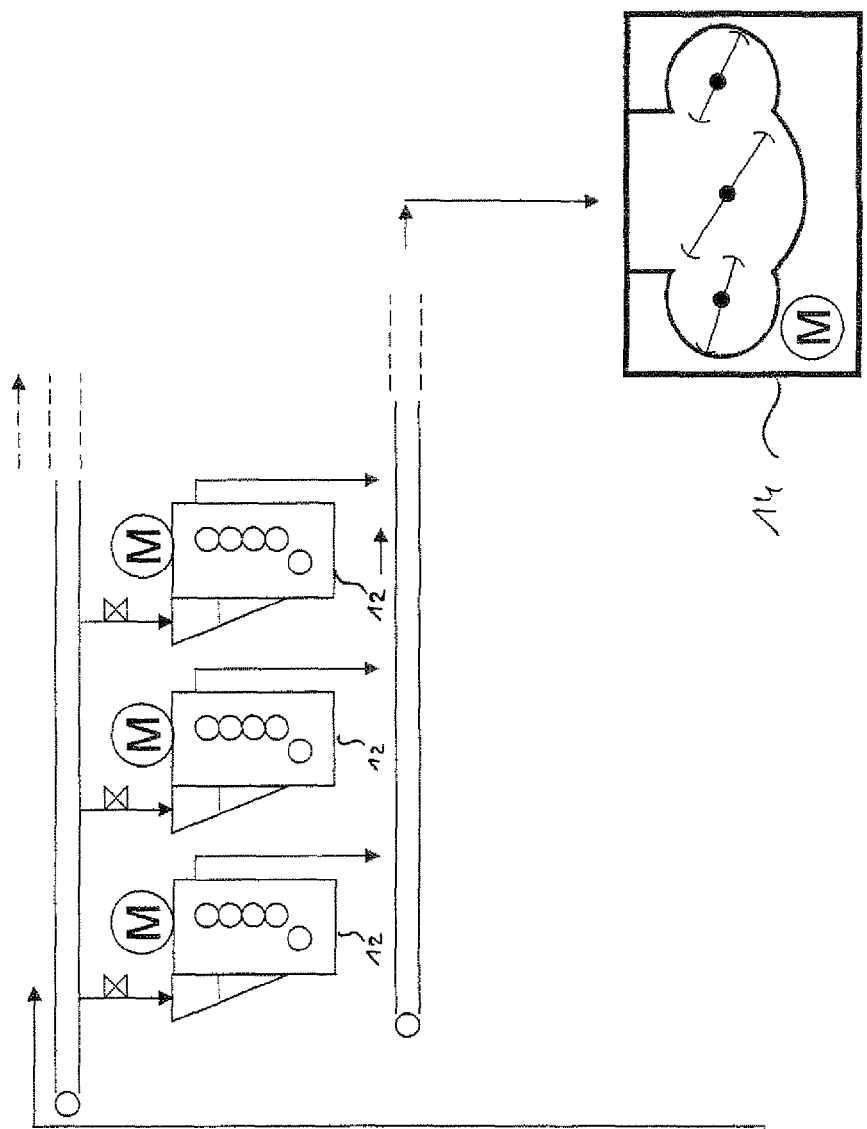
FIG. 1 shows a schematic diagram of a chocolate making process.
Figure 1:
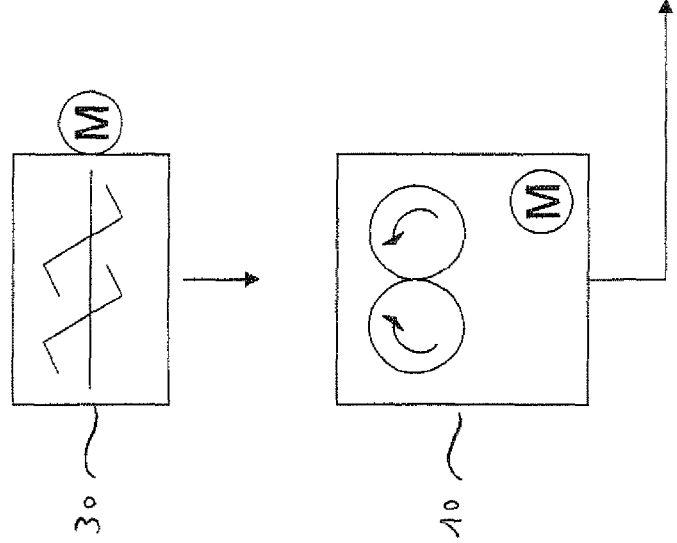

FIG. 1 schematically shows a process for making chocolate. Firstly, the ingredients of the chocolate mass are mixed in the mixer 30 and the mixed mass is supplied to a pre-refiner 10. The pre-refined mass is, in the embodiment shown, supplied to plural refiners 12. Thereafter, the refined mass is supplied to one or more devices for conching, of which one device 14 is shown in the drawing. Various motors are denoted with M.

Figure 2:
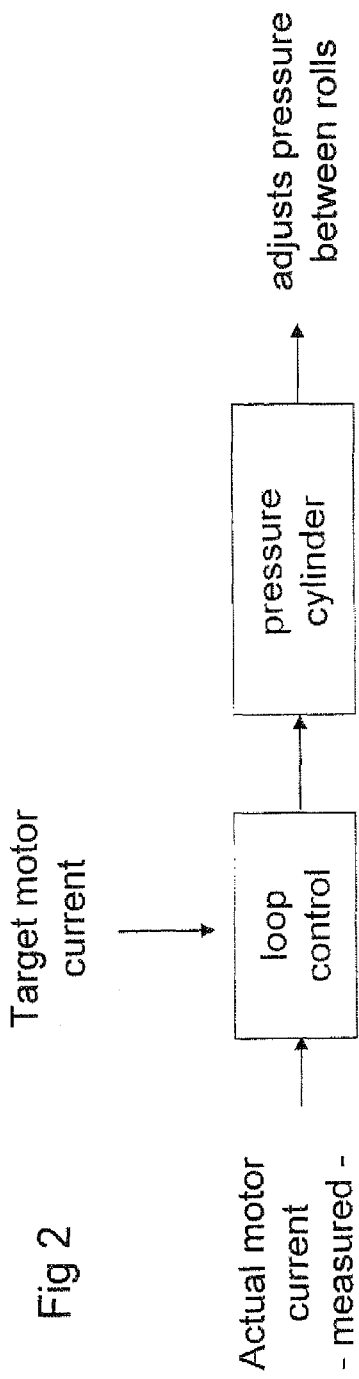
FIG. 2 shows a flowchart related to the control method described herein.

FIG. 2 schematically shows the control method which may, for example, be used for operating the pre-refiner 10. In a method of calibrating, as described above, a target motor current is determined. Moreover, the motor current taken up by at least one motor associated with at least one roller, is continuously measured, and the nip and, as a consequence, the pressure between the rollers is adjusted by a pressure cylinder so as to match the actual, measured motor current with the target motor current.

Figure 3B:
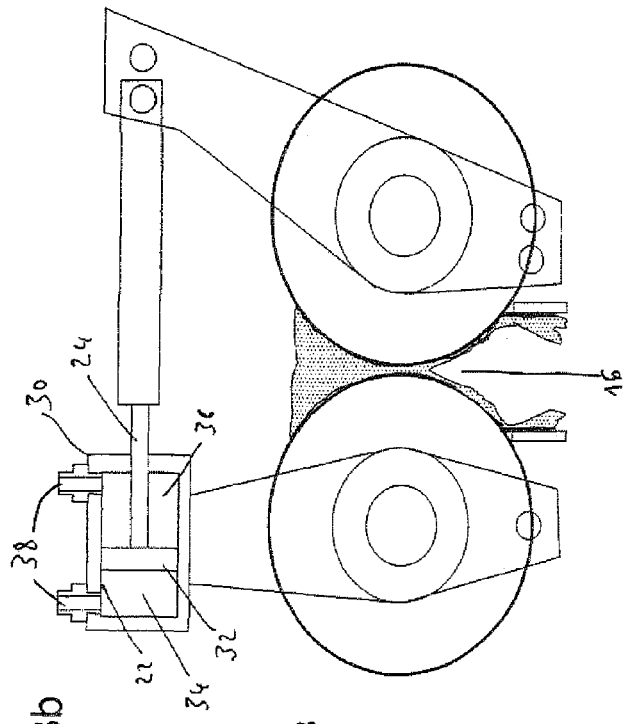
FIG. 3b shows an automated mechanism for adjusting a nip between rollers.
Figure 3A:
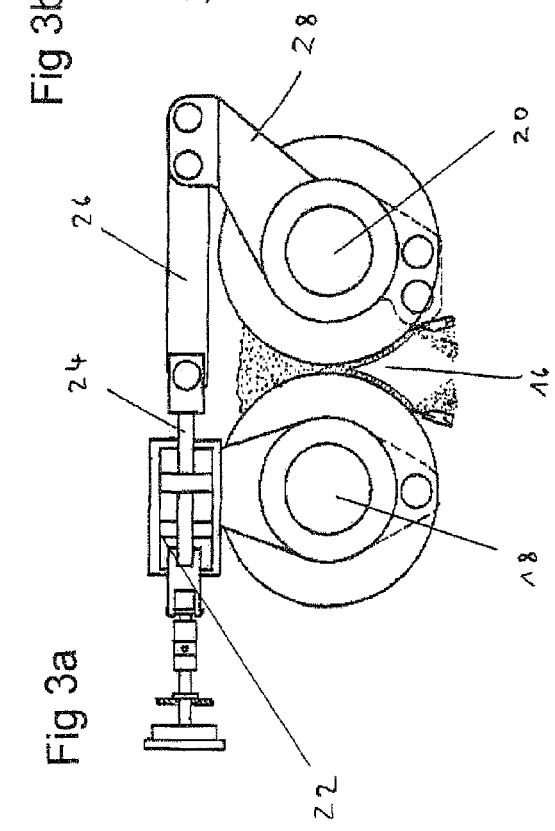
FIG. 3a shows a mechanism for adjusting a nip between rollers.

FIG. 3a shows a mechanism for adjusting a nip 16 between a first 18 and a second roller 20. In the embodiment shown, the first roller 18 is driven by a motor (not shown) of which the taken up current is measured. Moreover, in the embodiment shown, a pressure cylinder 22 is used to move one or both rollers 18, 20 in the left-right-direction of FIG. 3a so as to adjust the nip 16 between them. In this context, the movement of a piston rod 24 may be transmitted via a second rod 26 and a lever 28 to the roller 20. In the embodiment shown, the piston rod 24 is connected, via a clutch 30 and a link 32 and through a wall 34, of which only a part is shown, with a handwheel 36. Without the automated control as described herein, the handwheel 36 can be turned to adjust the pressure via the size of the nip 16 via the above-described pressure system. At least the handwheel 36, the link 32 and the clutch 30, which constitute a manual-pressure-regulation system, may be removed and may be replaced by an automated pressure-control valve (not shown in FIG. 3a).

FIG. 3b shows the mechanism of FIG. 3a, however, with an automated pressure-control valve 30. As can be taken from the figure, piston rod 24 is connected with a piston 32 which divides the pressure cylinder 22 into a first 31 and a second chamber 36. By adjusting the position of piston 32, the size of the nip 16 may be adjusted as described before with reference to FIG. 3a. The position of piston 32 may, for example, be adjusted by supplying hydraulic fluid through one of the ports 38 into one of the chambers 34, 36 and allowing excessive hydraulic fluid to be discharged through the port connected with the other one of chambers 34, 36. This flow of hydraulic fluid may be controlled by electrical signals which may be delivered by a control unit based on the fact that the actual motor current is not in line with the target motor current. Through the above-described automated pressure-control system, the pressure acting on the piston rod 24 may be regulated, and via the second rod 26 and the lever 28, the nip 16 may be adjusted appropriately.

Figure 4:
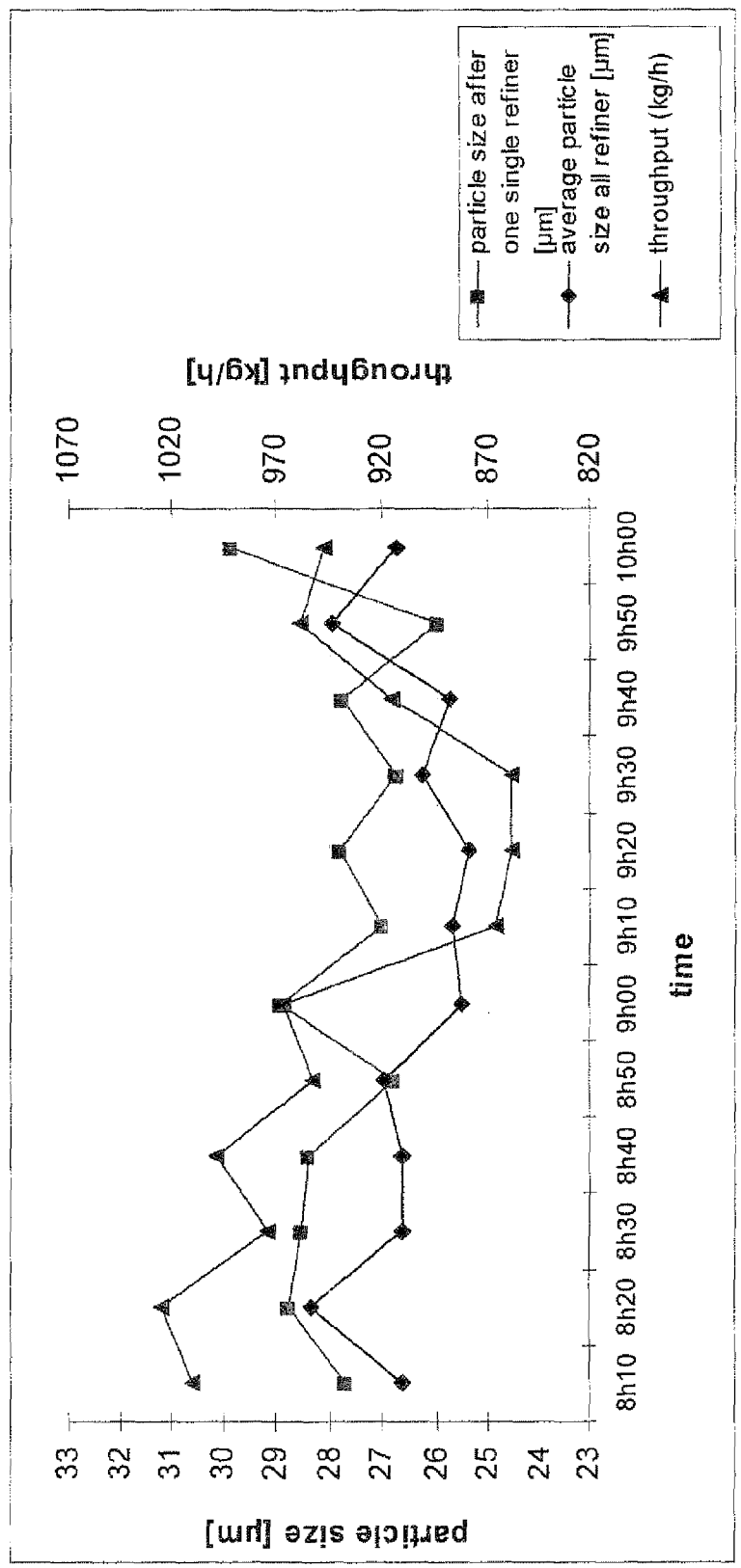
FIG. 4 shows experimental results related to the particle size and the yield over time before using the method described herein.

FIG. 4 shows the results of tests regarding the particle size measured in micrometers and the yield, measured in kilograms per hour. As can be seen at the X-axis of the diagram, over a measured time span of two hours, both the yield and the particle size vary significantly. FIG. 4 shows the situation before applying the method described herein. It is to be noted that those lines in FIGS. 4 and 5 having a square with horizontal and vertical sides, show the particle size after refining and the lines having the squares with oblique sides, show the particle size at the end of a line for producing a chocolate mass.

Figure 5:
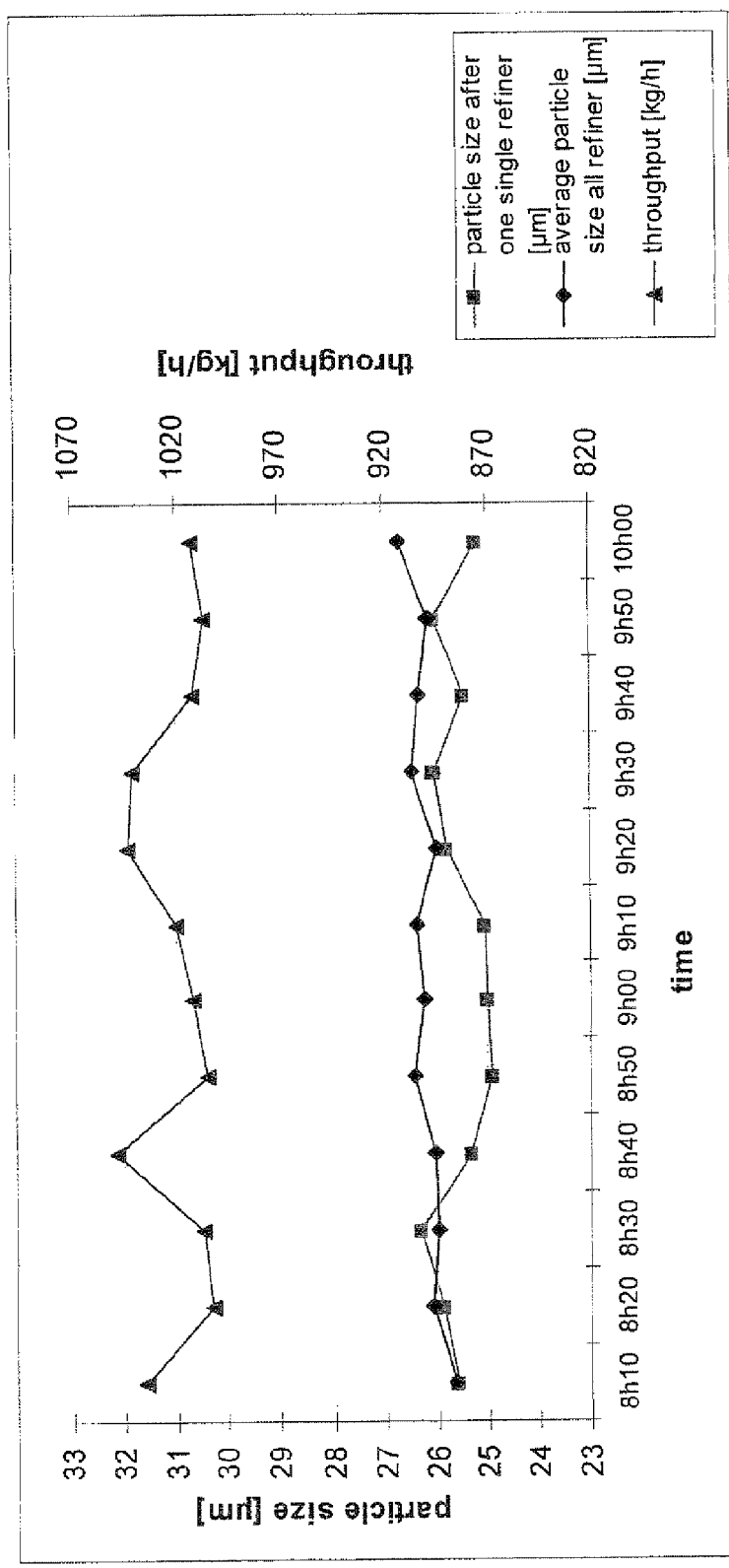
FIG. 5 shows experimental results related to the particle size and the yield over time using the method described herein.

FIG. 5 shows the test results when the method described herein is used. It can be seen that both the particle size and the yield do not vary as significantly as shown in FIG. 4. Moreover, the average yield is significantly higher than before. As regards the variation in the values shown in FIGS. 4 and 5, the variation of the particle size after refining could be reduced from 14% to 4%, the variation of the particle size at the end of the line could be reduced from 11% to 2%, and the variation in the yield could be reduced from 17% to 6%. This was obtained by the conducted experiments and as applied in regular production. Moreover, the average yield could, as desired, be increased significantly. Finally, it was observed that there was a reduced downtime of the pre-refiner when the method described herein was used, and there is evidence that the wear of the rollers for the refiners will be more evenly balanced across the width of the rolls thus maintenance efforts will be reduced.

The invention claimed is:

1. A method of controlling a process in which the particle size of a material is reduced by passing the material through a nip between rollers, the method comprising:
    setting a target operational figure of at least one motor associated with at least one roller, the target operational figure of the at least one motor being a target motor current value selected to provide a desired particle size and/or mass consistency;
    continuously measuring actual motor current value of the least one motor associated with the at least one roller as the material passes through a nip between the rollers; and
    adjusting the nip between the rollers in response to a determination that the actual motor current value of the at least one motor deviates from the target motor current value to return the actual motor current value of the at least one motor to the target motor current value.

2. The method of claim 1, wherein the material is a powder and/or a semi-liquid.

3. The method in accordance with claim 1, wherein the process for reducing the particle size is a pre-refining process in a process for making a confectionery mass.

4. The method of claim 3, wherein the process for making a confectionery mass is a chocolate making process.

5. The method of claim 1, wherein the target operational figure of at the least one motor further comprises a target power value taken up by the motor selected to provide the desired particle size and/or mass consistency.

6. The method of claim 1, wherein the target operational figure of at the least one motor further comprises a target torque provided by the motor selected to provide the desired particle size and/or mass consistency.

7. The method of claim 1, wherein the target operational figure of the at least one motor further comprises a target number of revolutions per unit time of the motor selected to provide the desired particle size and/or mass consistency.

8. The method of claim 1, further comprising detecting that the actual motor current value of the at least one motor deviates from the target motor current value.

9. The method of claim 1, wherein the target operational figure of the at least one motor associated with the at least one roller is a target motor current value selected to provide a desired throughput in kg/hr.

10. A machine for reducing the particle size of a material by passing the material through a nip between rollers, the machine comprising a device configured to measure an actual motor current value of at least one motor associated with at least one roller, and a device configured to adjust the nip between the rollers in response to a determination that the actual motor current value of the at least one motor deviates from a target motor current value of the at least one motor, the target motor current value being selected to provide a desired particle size and/or mass consistency, wherein adjustment of the nip between the rollers is effective to return the actual motor current value of the at least one motor to the target motor current value of the at least one motor.

11. The machine in accordance with claim 10, wherein the machine is a pre-refiner in a machine for making a confectionery mass.

12. The machine of claim 11, wherein the machine for making a confectionery is a chocolate making machine.

13. A chocolate making machine comprising at least one mixer, at least one machine in accordance with claim 10, at least one refiner and at least one device for conching and/or homogenization.

14. The machine of claim 10, wherein the device configured to measure the actual motor current value of the at least one motor associated with at least one roller is further configured to detect that the actual motor current value of the at least one motor deviates from the target motor current value.

15. The machine in accordance with claim 10, wherein the target motor current value of the at least one motor is selected to provide a desired throughput in kg/hr.

16. A method of calibrating a machine for reducing the particle size of a material by passing the material through a nip between rollers, the method comprising:
   measuring actual motor current value of at least one motor associated with at least one roller to determine an actual motor current value that provides a desired particle size and/or mass consistency; and
   setting the actual motor current value determined to provide a desired particle size and/or mass consistency as a target operational figure of the at least one motor.

17. The method of claim 16, wherein the motor current of the at least one motor is measured continuously.

18. The method of claim 16, further comprising measuring actual power taken up by the motor to determine an actual power value that provides a desired particle size and/or mass consistency; and setting the actual power value determined to provide a desired particle size and/or mass consistency as a second target operational figure of the at least one motor.

19. The method of claim 16, further comprising measuring actual torque provided by the motor to determine an actual torque value that provides a desired particle size and/or mass consistency; and setting the actual torque value determined to provide a desired particle size and/or mass consistency as a second target operational figure of the at least one motor.

20. The method of claim 16, further comprising measuring actual number of revolutions per unit time of the motor to determine an actual number of revolutions per unit time that provides a desired particle size and/or mass consistency; and setting the actual number of revolutions per unit time determined to provide a desired particle size and/or mass consistency as a second target operational figure of the at least one motor.

21. The method of claim 16, further comprising detecting that the actual motor current value of the at least one motor deviates from the target operational figure.

22. The method of claim 16, further comprising setting the actual motor current value determined to provide a desired throughput in kg/hr.

\* \* \* \* \*